Dec. 4, 1923.  
M. F. PHELPS  
1,476,023  
MACHINE FOR FEEDING AND DISTRIBUTING CONTAINERS  
Filed Sept. 30, 1921  
3 Sheets-Sheet 1
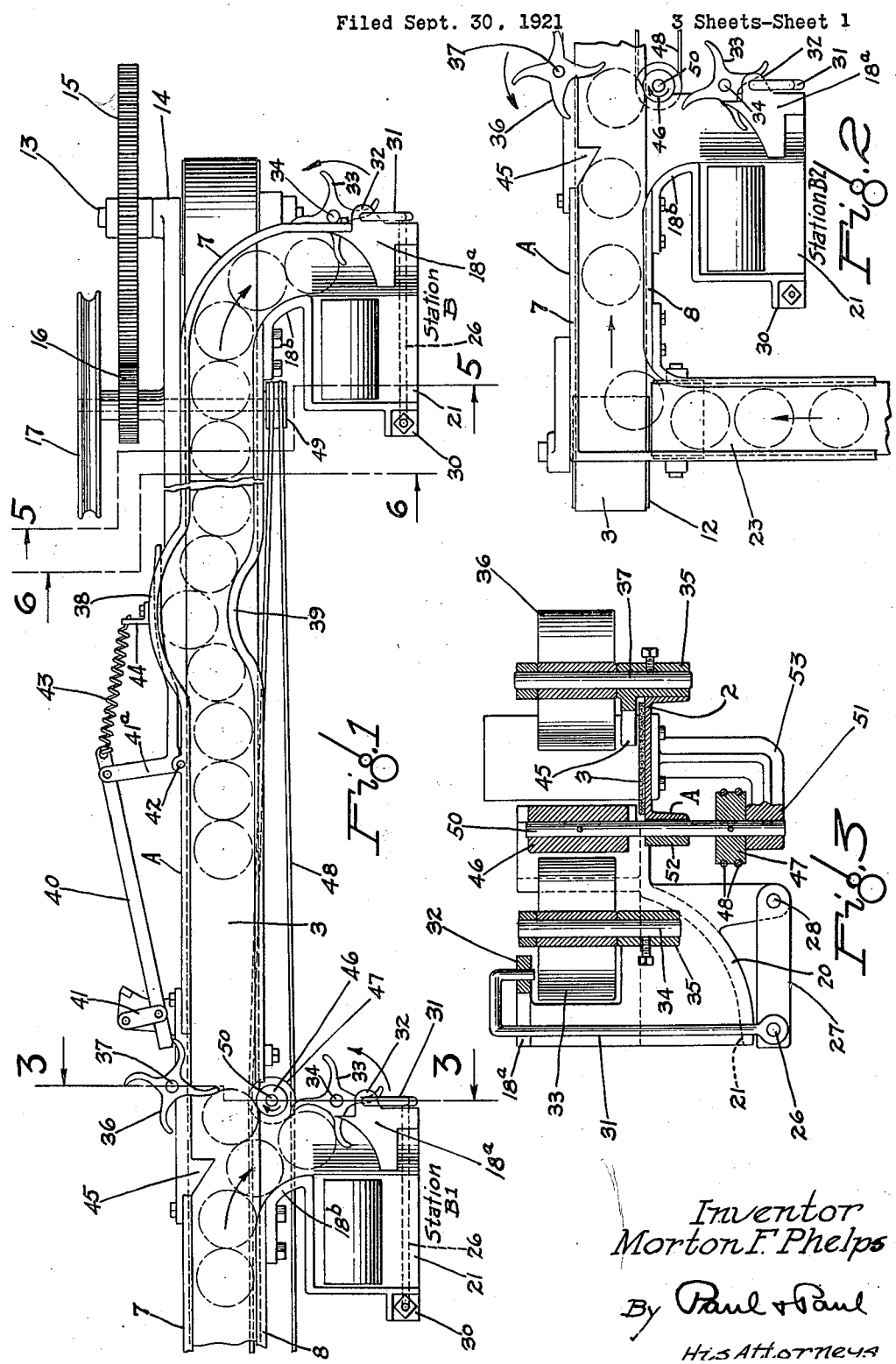
Inventor  
Morton F. Phelps  
By Paul & Paul  
His Attorneys

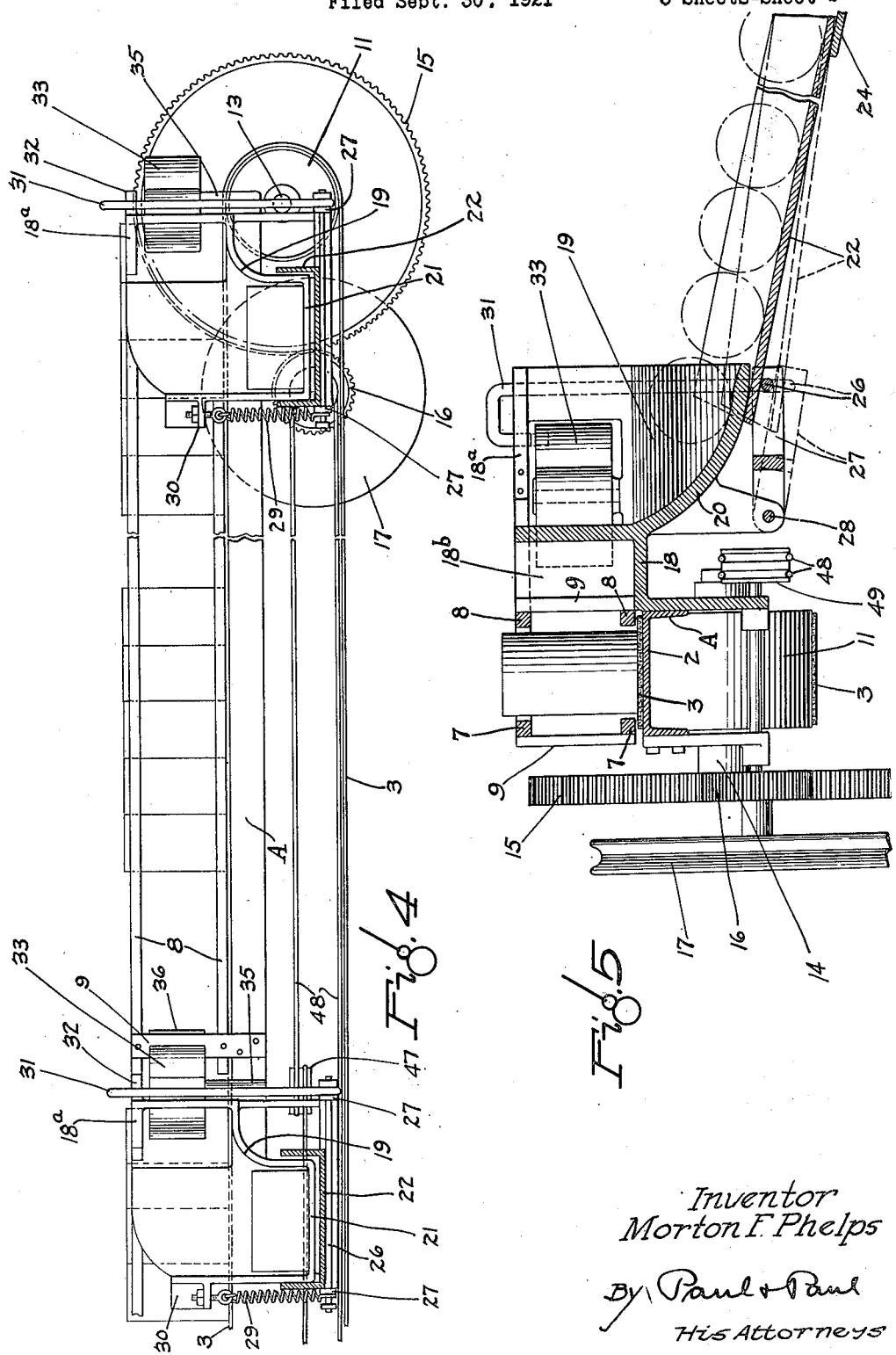

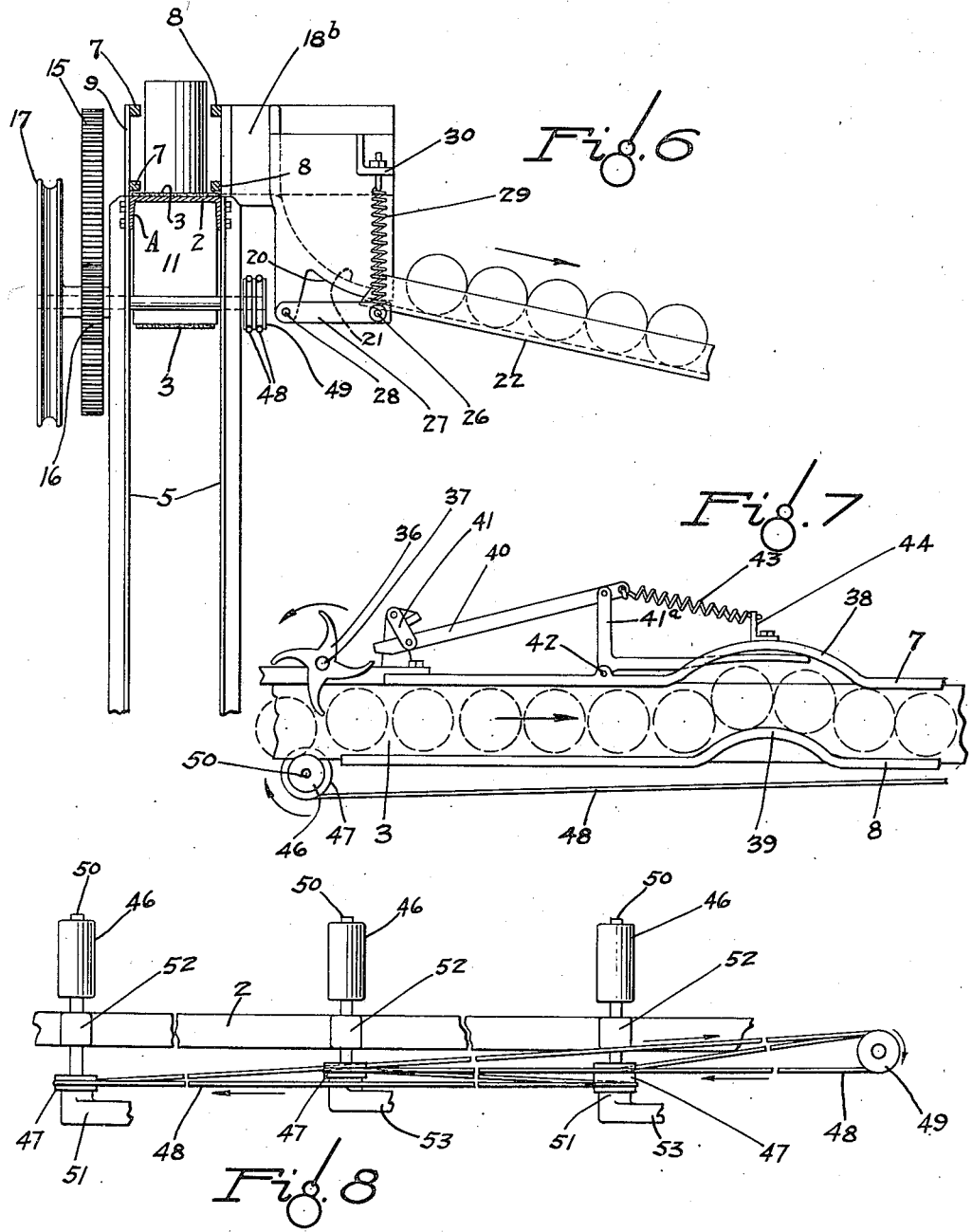

Patented Dec. 4, 1923.

1,476,023

UNITED STATES PATENT OFFICE.

MORTON F. PHELPS, OF LITTLE ROCK, ARKANSAS, ASSIGNOR TO PHELPS MANUFACTURING COMPANY, OF LITTLE ROCK, ARKANSAS, A PARTNERSHIP CONSISTING OF FRANK PHELPS AND MORTON F. PHELPS.

MACHINE FOR FEEDING AND DISTRIBUTING CONTAINERS.

Application filed September 30, 1921. Serial No. 504,300.

*To all whom it may concern:*

Be it known that I, MORTON F. PHELPS, a citizen of the United States, resident of Little Rock, in the county of Pulaski and State of Arkansas, have invented certain new and useful Improvements in Machines for Feeding and Distributing Containers, of which the following is a specification.

This invention relates to improvements in machines designed for feeding articles, such as baking powder cans, and distributing them to other machines where other operations are to be carried out in connection therewith. In the embodiment of the invention shown and described in this application I have illustrated the invention as applied to the conveying and feeding of filled cans of baking powder which are distributed to suitable machines by which labels are applied to said cans.

The invention consists generally in the constructions and combinations hereinafter described and particularly pointed out in the claims.

In the accompanying drawings:

Figure 1 is a plan view of a distributing machine embodying my invention, a portion of the can receiving end of the machine being broken away;

Figure 2 is a plan view of the can receiving end of the machine shown in Figure 1;

Figure 3 is a transverse vertical section on line 3—3 of Figure 1, looking in the direction of the arrows;

Figure 4 is a side elevation of the portion of the machine shown in Figure 1;

Figure 5 is a section on line 5—5 of Figure 1, looking in the direction of the arrows;

Figure 6 is a vertical section on line 6—6 of Figure 1, looking in the direction of the arrows;

Figure 7 is a plan view of a portion of the machines shown in Figure 1, illustrating the gate-wheel unlocked so as to permit passage of the cans by said wheel;

Figure 8 is a side elevation partly broken away, of the drive for the upstanding live rolls of the conveyer.

In application No. 412,665, filed by me in the United States Patent Office on September 25th, 1920, a machine is shown and described for labeling cans, and the machine shown in said application has been largely used for applying labels to filled cans of baking powder. I find it desirable to arrange a number of these labeling machines side by side, and to arrange a corresponding number of stations to supply the labeling machines with filled cans from a common conveyer or carrier which brings them from the filling and cover-applying machines. As the labeling machines are not absolutely uniform in production there will be slight variations in the number of cans required for the different machines. It is, therefore, desirable to provide a series of stations at which the cans will pass from the common conveyer to the individual labeling machines, and to have each machine control automatically the number of cans fed to it.

Mechanism controlled by the labeling machines is, therefore, provided for automatically regulating the supply of cans to each machine, whereby each machine is constantly supplied with as many cans as are necessary to keep it in continuous operation.

In the drawings, 2 represents the main bed of the machine over which travels an endless conveyer or belt 3. This bed constitutes the main element of a longitudinally extending frame designated generally by the reference letter A, and which is preferably supported at any desired height to permit a gravity feed of the cans from the conveyer to the several labeling machines. The bed 2 is preferably supported upon suitable standards 5, 5, at a suitable height above the feed chutes of the labeling machines. Outer and inner side rails 7 and 8 extend longitudinally of the frame A of the machine above the bed plate and the endless conveyer, as shown in Figures 5 and 6. These rails are preferably supported by vertical standards 9, 9, and serve to retain the cans in upright position as they are moved forward by the endless belt or conveyer 3. The endless belt passes around a belt pulley 11 at one end of the machine, and around a corresponding pulley 12 at the opposite end of the machine. The pulley 11 is preferably driven through a shaft 13, mounted in bearings 14, and as here shown the shaft 13 is provided with a suitable gear 15, driven from a pinion 16, and driving pulley 17 (see Figures 1 and 4).

By this means the shaft 13 and pulley 14 are driven at any suitable speed, and the conveyer 13 is also driven at the desired speed.

Secured to the rear end of the bed-plate 2 is a casting 18 which forms a continuation of said bed, and extends to one side thereof. This casting has a downwardly inclined portion 19 (see Figures 4 and 5) formed integrally with an outwardly sloping and preferably slightly concaved section 20 thus forming a chute 21 having a double incline by which the cans are turned down and rolled horizontally out of the machine (see Figures 5 and 6).

The outer rails 7 are preferably outwardly curved at their rear ends and fastened to a curved section $18^a$ of the casting 18 and the inner rails 8 are fastened to a curved section $18^b$, so as to guide the cans brought along by the conveyer belt off from said belt, and into the chute 21 (see Figures 1, 2 and 5), from which they roll into a spout 22 by means of which they are directed by gravity to the labeling machines.

I have indicated in the drawings (see Figure 2) an intake carrier or conveyer 23, which may be of any preferred construction, and by means of which the cans are delivered onto the endless belt 3 from any desired direction. The trough 22 has its lower end preferably supported on the feed chute of the labeling machines (indicated in Figure 5, at 24), and the upper end of this trough is carried by a rod 26, mounted in links 27, pivoted at 28 to the frame of the machine, and held in an elevated position by a spiral spring 29 having its upper end adjustably connected to a lug 30 upon the side of the casting 18, the lower end of said spring being connected to the rod 26 near one end thereof. A wheel locking rod 31 is also connected to the rod 26 (see Figure 3) and extends upward, through a guiding lug 32 on the casting section $18^a$. The upper end of the rod is bent over and turned downward (see Figures 3 and 5) for the purpose of locking the rotatable gate-wheel 33 as hereinafter described.

I provide a stud 34 secured in a boss 35 preferably cast integral with the casting 18 (see Figure 3), and upon the stud 34 I mount the rotating gate-wheel 33 having preferably inclined arms or blades, as indicated in Figures 1 and 2. This gate-wheel 33 is adapted to be rotated freely upon its support by pressure of the cans as they are brought in contact with the successive arms of said gate-wheel as the main group of cans on the carrier is being moved along over the bed plate by the means described. When said cans approach the end of the conveyer, they are directed laterally by the curved portions of the rails 7 (see Figure 1). If the regulating gate-wheel 33 is free to turn upon its supports, said cans will pass onto the inclined wall of the chute, and will be tipped down into a horizontal position, as indicated in Figures 4 and 5, and said cans will roll out of said chute 70 and into the trough 22. Should a number of cans accumulate in the trough 22 so that their weight is sufficient to move downward the upper end of the trough 22 against the tension of the spring 29, as indicated by dotted lines in Figure 5, the down-turned end of the rod 31 will be brought into the path of the gate-wheel 33 and will lock said wheel against turning upon its axis, and thereby stop the discharge of cans into the chute 21 and trough 22. As soon as the cans, or a sufficient number of them, have passed out of the trough 22, the spring 29 will raise the upper end of the trough, raising also the rod 31 and bringing its end out of the path of the regulating gate-wheel 33. As the wheel 33 is released the cans will begin again to pass from the conveyer 3 into the chute 21 and the trough 22 as hereinbefore described.

I have indicated the three stations shown in the drawings at which cans are discharged from the common conveyer to the labeling machines as B, B' and $B^2$. At each station B, B' or $B^2$ there is provided a trough 22 and a chute 21, so that each labeling machine may be supplied with cans from the endless conveyer 3, which is a common conveyer for all of the stations and labeling machines with which it is arranged to operate. The end chute 21 (the one at the first or right-hand station B in Figure 1) has the cans guided to it by the laterally turned portions of the rails 7. The friction between the cans and the endless conveyer 3 is sufficient to feed the cans regularly into the lateral chute 21 except when said chute is blocked by the locking of the gate-wheel 33, as hereinbefore described. When said chute is blocked the cans will accumulate on the conveyer back of the first station B, as indicated in Figures 1 and 7.

I provide means for blocking the passage of cans beyond the second station B' when a sufficient supply of cans has accumulated at the first station B. And in the same way I provide means for blocking the passage of cans at the third station when there is a sufficient accumulation of cans at the first and second stations, and so on for as many stations and labeling machines as may be provided in connection with any common conveyer.

As before stated unless there is an accumulation of cans on the conveyer at the first station, all of the cans that are brought forward by the conveyer will pass through the chute of the station B, the first station to receive cans from the conveyer, although the farthest station from the receiving end of the conveyer. As more cans are ordinarily fed to the common conveyer 3 than can be taken care of by one labeling machine, there will be an accumulation of cans in the trough 22, and a consequent locking of the gate-wheel 33 at the station B. This will cause the cans to accumulate and crowd together on the conveyer near the station B, as indicated in Figure 1.

At each of the stations following station B I provide a gate-wheel 36, corresponding to the gate-wheel 33 and similarly mounted to rotate freely upon a stud 37. I also provide a curve or off-set 38 in each of the rails 7, and a slightly smaller off-set 39 in the rails 8, at a point a short distance from the station B, and I provide at the side of the frame of the machine a locking arm 40, preferably having its forward end carried by a link 41, and arranged in proximity to the gate-wheel 36 (see Figures 1 and 7). The other end of the arm 40 is connected to a bell-crank lever $41^a$, pivoted at 42 upon the frame of the machine and having its long arm projecting inside of the curved portion 38 of the rails 7 (see Figure 1). A spring 43 is connected preferably to the end of the arm 40, and to a lug 44 upon the frame of the machine. Normally these parts will stand in the position shown in Figure 7 and the gate-wheel 36 will be free to rotate upon its stud. When, however, the gate-wheel 33 at station B is locked the movement of the cans at station B will be checked, and the cans striking the off-set 39 on the rails 8 will tend to crowd together, and the can opposite the curved part 39, of the rail 8, will be forced towards the off-set 38 in the side rails 7, as indicated in Figure 1, and will press against the long arm of the bell-crank lever $41^a$, pushing the end of the bar 40 into the path of the gate-wheel 36, as illustrated in Figure 1, locking said wheel and preventing passage of any cans by the second station B'.

At station B' a deflecting lug 45 is preferably provided near the gate-wheel 36 as shown in Figure 1. This lug deflects each can towards the chute 21 of this station. If, however, the gate-wheel 36 is free to turn the cans will pass this station, being aided in such movement by the upright rotating rolls 46, one of said rolls being provided for each station after first one, and all of said rolls being provided with pulleys 47, and all being preferably driven by a common belt 48, from a drive pulley 49, each roll being arranged upon a short vertical shaft 50 mounted in suitable bearings 51, 52, the bearing 52 being secured upon the side of the bed plate 2, and the bearing 51 being preferably carried by a bracket 53 secured to the under side of the bed plate. When the gate-wheel 36 at station B' is locked, as indicated in Figure 1 one of the cans will be held against an arm of said gate-wheel by the movement of the conveyer belt and the rotation of the live roll 46 and said stationary can will substantially form a deflector contiguous to the deflecting lug 45. The other cans, as they are brought along the conveyer will, therefore, be further deflected by the stationary can, and will enter the chute 21 at station B' and pass to the labeling machine at that station.

In the absence of a can held stationary by the roll 46 and the gate-wheel 36, the cans on the conveyer will be deflected by the lug 45 against the roll 36, (see Fig. 2) the rotation of which in the direction of the arrow, will prevent the passage of any cans into the chute 21, but will cause them to move forward on the conveyer 3. A similar device will preferably be provided, at the side of the conveyer, between the station B' and the station $B^2$ for locking a corresponding gate-wheel 36 at station $B^2$.

This arrangement may be duplicated for each station and labeling machine that is to be supplied with cans from the common conveyer.

While I have illustrated and described my invention as particularly adapted for feeding cans of baking powder to labeling machines it will be understood that I do not limit myself to the use of the machine for any particular type or style of containers, or any particular material enclosed in or carried by such containers, as the mechanism may be used without reorganization for the feeding and automatic distribution, at different stations, of a great variety of containers and other articles.

I claim as my invention:

1. The combination, in a machine of the class described, with a traveling conveyer arranged to receive articles to be distributed, of a plurality of chutes leading from said conveyer and located at different stations along the same, means arranged to receive articles from each chute, and means located at each station for closing the passage to the station chute when articles have accumulated in excess of a predetermined number in the receiving means.

2. The combination, in a machine of the class described, with a traveling conveyer arranged to receive articles to be distributed, of a plurality of chutes leading from said conveyer and located at different stations along the same, a trough in connection with each chute for receiving articles therefrom, and means operated by said trough for closing the passage from the conveyer to the chute when articles in excess of a predetermined number have been accumulated in said trough.

3. The combination, in a machine of the class described, with a traveling conveyer arranged to receive articles to be distributed, of a plurality of chutes leading from said conveyer and located at different stations along the same, a spring-supported trough in connection with each chute for receiving articles therefrom, and means, operated by the movement of said trough, for closing the passage from the conveyer to the chute when articles in excess of a predetermined number have accumulated in said trough.

4. The combination, in a machine of the class described, with a traveling conveyer arranged to receive articles to be distributed, of a plurality of chutes leading from said conveyer and located at different stations along the same, said conveyer being arranged, when the passage is not interrupted, to convey all of the articles, received by it to the station farthest from the receiving point, means at each station for closing the passage of articles from the conveyer to the station chute, and means located at each station and operated by the accumulation of articles in excess of a predetermined number on the conveyer at said station, for directing the passage of articles from the conveyer to the chute at the next preceding station.

5. The combination, in a machine of the class described, with a traveling conveyer arranged to receive articles to be distributed, of a plurality of chutes leading from said conveyer and located at different stations along the same, said conveyer being arranged, when the passage is not interrupted, to convey all of the articles received by it to the station farthest from the receiving point, means at each station for closing the passage of articles from the conveyer to the station chute, and means operated by the accumulation of articles in excess of a predetermined number on the conveyer at any station, for directing the passage of articles from the conveyer to the chute at the next preceding station.

6. The combination, in a machine of the class described, with a traveling conveyer arranged to receive articles to be distributed, of a chute leading from said conveyer and located at a predetermined point along the same, means arranged to receive articles from said chute, and means for closing the passage from the conveyer to the station chute when articles have accumulated in excess of a predetermined number in the receiving means.

7. The combination, in a machine of the class described, with a conveyer arranged to receive articles to be distributed, of a chute leading from said conveyer and into which articles may be directed therefrom, of a gate arranged to close the passage from said conveyer to said chute, means for receiving articles from said chute, and means operated by the receiving means for locking said gate when a predetermined supply of articles has accumulated in the receiving means.

8. The combination, in a machine of the class described, with a conveyer arranged to receive articles to be distributed, of a chute leading from said conveyer and into which articles may be directed therefrom, a gate arranged to close the passage from said conveyer to said chute, spring-supported means for receiving articles from said chute, and means supported by the depression of said receiving means against the tension of its supporting spring for locking said gate when a predetermined supply of articles has accumulated in the receiving means.

9. The combination, in a machine of the class described, with a traveling conveyer and guard rails extending longitudinally of said conveyer and having an off-set portion, of a gate-wheel rotatably mounted in proximity of said conveyer and adapted to have an arm thereof project over said conveyer and form a barrier to the passage of articles, locking means for said gate-wheel, and an actuating lever for said locking means having an arm projecting lengthwise of said conveyer in proximity to the off-set portion of said rail, said lever being arranged to be actuated by the pressure of an article on said conveyer that is forced sidewise into the off-set portion of said rails.

10. The combination, in a machine of the class described, with a traveling conveyer arranged to receive articles to be distributed, of a chute leading from said conveyer, means for directing the articles from said conveyer into said chute, a downwardly curved bottom section in said chute for tilting said articles, and an outwardly curved or slanting bottom section for discharging said articles from said chute.

11. The combination, in a machine of the class described, with a traveling conveyer arranged to receive articles to be distributed and a discharge chute leading from said conveyer, of a guide member for said articles arranged longitudinally above said conveyer, a deflecting guide section for directing the articles to said chute, and a driven rotating member arranged opposite said deflecting guide section for directing the articles past said chute.

12. The combination, in a machine of the class described, with a traveling conveyer arranged to receive articles to be distributed, of guide members arranged longitudinally above said conveyer, a discharge chute leading from said conveyer, means for conducting articles upon said conveyer past said discharge chute and means co-operating with said conveyer, said articles and said guide members for automatically blocking the passage of articles past said discharge chute and directing them into said chute.

13. The combination, in a machine of the class described, with a traveling conveyer arranged to receive articles to be distributed and a plurality of discharge chutes leading from said conveyer, of guide members arranged longitudinally above said conveyer means co-operating with said guide members for conducting all of said articles past one or more of said discharge chutes and directing them into a succeeding chute, means for laterally displacing said articles upon said conveyer between said chutes and means caused to operate by said displacement for directing articles into the preceding chute when a predetermined number of articles has accumulated between said chutes.

14. The combination, in a machine of the class described, with a traveling conveyer arranged to receive articles to be distributed, and a plurality of discharge chutes leading from said conveyer, of guide members arranged longitudinally above said conveyer, irregular sections in said guide-members between said chutes for effecting a normal lateral displacement of said articles upon said conveyer when the articles are freely passing said curved section and a greater displacement when the articles are blocked on said conveyer between said chutes and means, caused to operate by the greater displacement of the articles, to block the passage of containers at the preceding discharge chute.

15. The combination, in a machine of the class described, with a traveling conveyer arranged to receive in an upright position other cylindrical articles to be distributed, of a chute leading from said conveyer, means for directing the articles from said conveyer into said chute, said chute being provided with laterally and outwardly inclined bottom sections, whereby said articles are tilted into a substantially horizontal position and are discharged by rolling from said chute.

In witness whereof, I have hereunto set my hand this 30th day of June 1921.

MORTON F. PHELPS.